United States Patent [19]
Lechman

[11] Patent Number: 5,597,218
[45] Date of Patent: Jan. 28, 1997

[54] MONITOR SUPPORT STRUCTURE FOR TILT ANGLE ADJUSTMENT

[75] Inventor: John N. Lechman, Effingham, Ill.

[73] Assignee: Nova Manufacturing & Assembly, Inc., Effingham, Ill.

[21] Appl. No.: 451,028

[22] Filed: May 31, 1995

[51] Int. Cl.⁶ ................................................. A47B 97/00
[52] U.S. Cl. ...................... 312/223.3; 248/918; 248/922; 248/346.01
[58] Field of Search ................... 312/223.3; 248/346.01, 248/918, 919, 921, 922, 923; 108/4; 297/423.41, 423.44, 423.46

[56] References Cited

U.S. PATENT DOCUMENTS

| | | | |
|---|---|---|---|
| 3,452,372 | 7/1969 | Emery | 297/423.41 X |
| 3,580,634 | 5/1971 | Bock | 297/423.46 X |
| 4,076,876 | 2/1978 | Bowles | 297/423.41 X |
| 4,590,866 | 5/1986 | Schairbaum . | |
| 4,615,502 | 10/1986 | McLaughlin | 248/923 X |
| 4,755,009 | 7/1988 | Price et al. . | |
| 5,071,204 | 12/1991 | Price et al. . | |
| 5,087,010 | 2/1992 | Walters . | |
| 5,125,727 | 6/1992 | Lechman et al. . | |
| 5,131,614 | 7/1992 | Garcia et al. | 248/918 X |
| 5,342,005 | 8/1994 | Semanda et al. | 248/918 X |
| 5,433,505 | 7/1995 | Coyne et al. | 297/284.5 X |
| 5,480,224 | 1/1996 | Ugalde | 312/223.3 X |

FOREIGN PATENT DOCUMENTS

| | | | |
|---|---|---|---|
| 1106895 | 8/1981 | Canada . | |
| 128511 | 12/1984 | European Pat. Off. | 248/923 |

OTHER PUBLICATIONS

"Ergonomically Designed V.D.T. Furniture" by Biotec received by Patent Office Oct. 15, 1984.

Primary Examiner—Peter M. Cuomo
Assistant Examiner—David E. Allred
Attorney, Agent, or Firm—Olson & Hierl, Ltd.

[57] ABSTRACT

A wedge-like structure which is interposable between an object and its supporting substrate surface and whose thickness is adjustable for purposes of adjusting the tilt angle of the object relative to the substrate surface. The structure is comprised of a stack of generally flattened component members wherein a layer of a releasable adhesive composition is located between and bonded to adjacent component members that can have various configurations. The wedge-like structure is particularly well adapted for incorporation into a monitor support assembly that is located under a transparent window in the top portion of a work station so that the monitor tilt angle is adjustable relative to the assembly by the wedge-like structure.

3 Claims, 1 Drawing Sheet

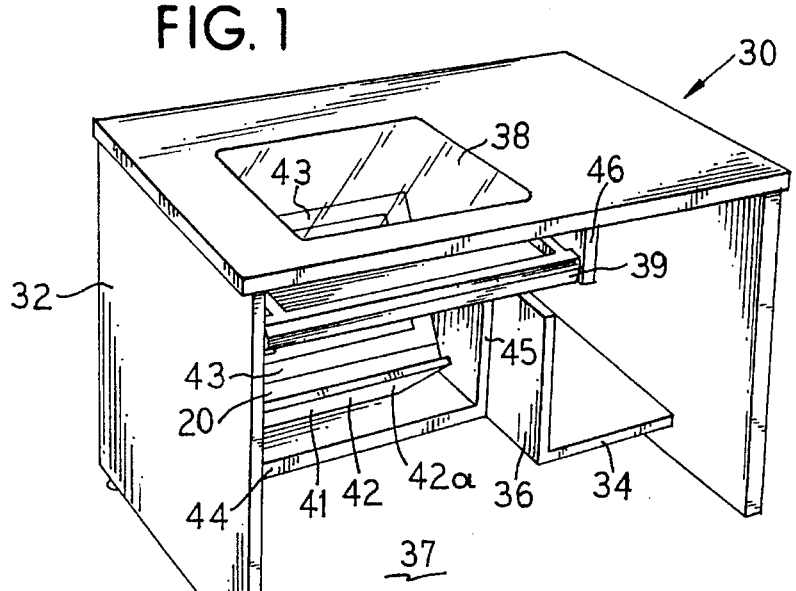
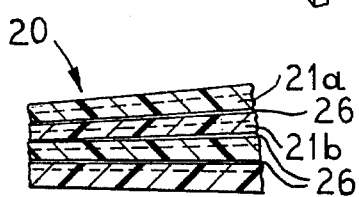
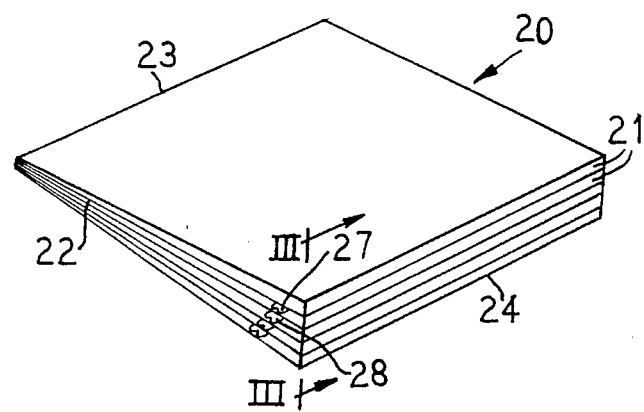
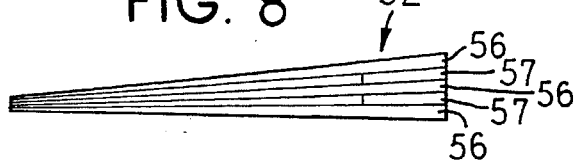
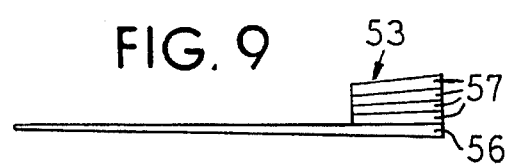
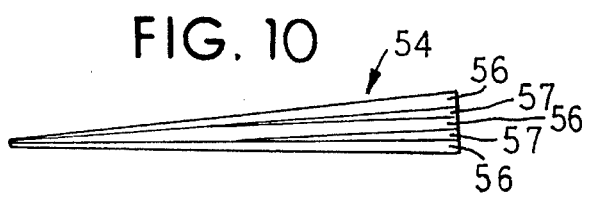

MONITOR SUPPORT STRUCTURE FOR TILT ANGLE ADJUSTMENT

FIELD OF THE INVENTION

This invention lies in the field of structures for tilt-angle adjustment of an object that rests on a shelf or the like, particularly la monitor that rests on an inclined shelf beneath a transparent window in a work station surface.

BACKGROUND OF THE INVENTION

Work stations with monitors located under the working surface are coming into wide spread use. The monitor is characteristically located at an inclined angle for viewability through a transparent window in the working surface by a user who is seated adjacent to the work station. Examples of such work stations are found in Schairbaum U.S. Pat. No. 4,590,866, Price et al. U.S. Pat. Nos. 4,755,009 and 5,071,204, Walters U.S. Pat. No. 5,087,010 and Lechman et al. U.S. Pat. No. 5,125,727.

Even when the under working surface monitor support assembly is adjustable, there is an apparent reluctance by a work station user to undertake adjustment of the monitor tilt angle. Evidently, such an adjustment is perceived to take too much time, or to be too complicated, or to be too risky (i.e., the monitor might be dropped).

The art needs a simple, reliable, and effective means for tilt angle adjustment of a supported member.

SUMMARY OF THE INVENTION

This invention relates to a wedge-like structure which is interposable between an object and its supporting substrate and whose thickness is adjustable for purposes of adjusting the tilt angle of the object relative to the supporting substrate.

Combinations of such a wedge-like structure with a monitor support assembly, particularly a monitor support assembly of the type adapted for holding a monitor beneath a transparent window in a work station top surface, are novel and are especially useful.

When a wedge-like structure is associated with the monitor support shelf of a monitor support assembly, the tilt angle of the monitor's viewscreen is adjustable. By varying the thickness of the wedge-like structure, the tilt angle of the monitor relative to the user is adjustable. Also, by interposing the wedge-like structure between the monitor support shelf and the monitor bottom, the tilt angle of the monitor is changeable relative to the tilt angle of the monitor when resting upon the monitor support shelf directly.

The wedge-like structure incorporates a stack of individually self-supporting, load-bearable, flattened members that are located in vertically adjacent, face-to-face relationship relative to each other. The stack defines in longitudinal vertical section a general wedge configuration such that the forward edge of the stack has a shorter vertical thickness than a rearward edge thereof.

The wedge-like structure has a layer of a releasable adhesive composition located between each adjacent pair of the flattened members. The adhesive layer has a bond strength sufficient to retain the adjacent flattened members in their stacked configuration but which is adapted to permit the respective flattened members of each adjacent member pair to be manually separated from each other. Thus, the structure thickness is selectively variable.

Various wedge-like structure configurations and individual flattened member configurations and arrangements are possible.

The wedge-like structure is simple, reliable, easy to use and requires no maintenance. The structure overcomes the prior art problems above indicated.

Other and further objects, aims, purposes, features, advantages, embodiments and the like will be apparent to those skilled in the art from the present specification taken with the accompanying drawings and appended claims.

BRIEF DESCRIPTION OF THE DRAWINGS

In the Drawings:

FIG. 1 is a perspective view illustrating the use environment for an embodiment of a wedge-like structure of this invention in combination with a monitor support assembly;

FIG. 2 is a perspective view of the wedge-like structure embodiment shown in FIG. 1;

FIG. 3 is an enlarged, fragmentary, vertical, longitudinal sectional view taken through the region III—III of FIG. 2;

FIG. 4 is a side elevational view of the FIG. 2 embodiment showing the manner in which one flattened member is separated from the wedge-like structure; and FIGS. 5 through 10 are each side elevational views of wedge-like structures similar to that shown in FIGS. 1–4, but each view shows a different alternative embodiment of a wedge-like structure of this invention.

DETAILED DESCRIPTION

Referring to FIGS. 1–4, there is seen one embodiment 20 of a wedge like structure of this invention. The structure embodiment 20 incorporates a stack 22 of a plurality of self-supporting, load-bearable, flattened members 21 which are located in vertically adjacent, face-to-face relationship relative to each other. Structure 20 illustratively uses at least five members 21, but more or less members 21 can be used, if desired. Each member 21 is adapted to support the load of an object which is intended to be rested upon the upper face thereof while the lower face is supported. The stack 22 characteristically defines in longitudinal vertical section (see FIG. 3, for example) a general wedge configuration so that a forward edge 23 of the stack 22 has a shorter vertical thickness than a rearward edge 24 thereof. As herein illustrated, the individual flattened members 21 comprising a given stack 22 can have various configurations, sizes and thicknesses. In structure 20, each individual one of the flattened members 21 has such a wedge configuration in longitudinal section.

Each member 21 can be comprised of various materials including wood, metal, plastic or the like. Each member 21, particularly for purposes of achieving relatively low density and relatively high structural strength characteristics can be formed with internal air spaces or the like. For example, a member 21 can be comprised of a so-called rigid organic polymeric foam, such as a foam comprised of a polyurethane or a polystyrene or the like. Alternatively, a member 21 can be comprised of a molded plastic having a solid or a honeycomb structure or the like where such plastic is, for example, a high density polyolefin (such as a polypropylene), a polyester, a polyamide, an epoxy resin, or the like. For purposes of achieving a smooth, continuous supporting surface, the intended upper surface of a member 21 can be bonded to a separately formed plastic film, such as a film comprised of polyethylene, polyvinylidene chloride, polyvinyl acetate, or the like. If desired, an adhesive, thermal bonding or other appropriate adhering means can be employed for associating the film with one face of a member 21.

In the presently preferred wedge-like structure 20, each member 21 has a similar wedge-like configuration. All members 21 each have the same surface sizes. The stacked members 21 combine to provide the desired greater thickness for rearward edge 24 relative to forward edge 23. Each member 21 is preferably comprised of rigid polyurethane foam.

Located between each adjacent pair of the members 21 is a layer 26 of a releasable adhesive composition. Each layer 26 has a bond and tack strength which is at least sufficient to retain adjacent flattened members 21 in their desired adjacent stacked relationship, but which also is characterized by a separation capacity such that each one of the adjacent members 21 can be separated from the other manually. Preferably, each layer 26 is applied to a bottom (or lower) face of each member 21 and is releasable from the adjacent top face of an adjacent member with out delaminating from the applied bottom face.

Optionally, structure 20 is provided with a pair of adjacent pull tabs 27 and 28 that extend outwardly from a common edge region between each pair of adjacent members, such as, for example, members 21a and 21b in FIG. 3. Each one of the pull tabs 27 and 28 is associated with a different respective one of the adjacent members 21a and 21b by an adhesive or the like (not shown). Such an adhesive can be, and preferably is, different from the adhesive employed in layer 26, but is compatible with, i.e., is non-reactive with, such adhesive in layer 26. Each pull tab 27 and 28 is individually graspable between finger portions of one hand (such as between the thumb and forefinger). Thus, the tabs 27 and 28 are manually pullable in opposite directions relative to one another. Thereby, separation of adjacent members 21, such as members 21a and 21b, one from the other is easily accomplishable.

Separation of a member 21a from a member 21b or the like results in diminution of the thickness of the original structure 20. Preferably, the adhesive comprising a layer 26 retains a sufficient amount of its bond and tack strength to permit the separated member 21a to be reassociated with the member 21b so that structure 20 can have substantially its original (starting) configuration, if desired. Thus, structure 20 has a thickness which is adjustable.

Structure 20 is usable for tilt-angle adjustment of an object. For example, referring to FIG. 1, there is seen an illustrative embodiment of a work station 30 that is in the form of a desk structure that has a horizontal working platform 31 with a flat top surface. Platform 31 is supported by a pair of longitudinally spaced side support walls 32 and 33 and by a back wall (not shown). On the right (relative to a user) interior side of the support wall 33 one edge of a horizontal shelf 34 is mounted and supported. The opposing edge of the shelf 34 is mounted to and supported by the bottom edge portion of a vertical support panel 36. Conventional fastening means are employed. Shelf 34 can support a personal computer (or CPU), printer, or the like (not shown). Between panel 36 and support 32, a kneehole 37 is defined.

Across the kneehole 37 between support wall 32 and support panel 36 extends a horizontal bracing shelf 44 which is mounted to and supported at one end by support wall 32 and at the opposite end by the bottom edge a vertical supporting brace 45. Shelf 44 and brace 45 are shorter in transverse (front to back) width than shelf 34 and panel 36 except for an upper forward projection 46 of brace 45, and shelf 44 and brace 45 are also mounted to the work station 30 back wall. Panel 36 is adjacent to, and is mounted to, brace 45.

Mounted in platform 31 over kneehole 37 between support 32 and panel 36 is a viewport or transparent window 38 comprised of glass or the like. Under and adjacent the platform 31 across the front of the kneehole 37 is mounted a keyboard platform or tray 39 (not detailed). Conventional drawer-type slides (not shown) are associated with opposing sides of tray 39 and interengage slidably with coacting slides associated with projection 46 and with a corresponding spaced, parallel plate (not shown) secured to the upper inside surface of support 32, thereby to provide slidability for keyboard tray 39 between open and closed positions.

In the kneehole 37, a monitor support assembly 41 is provided which utilizes a shelf member 42a and an integral flattened back member (not shown in FIG. 1) that upstands and extends from the rear of bottom portion 42a. Various work stations and monitor support structures can be used.

A monitor 43 is rested upon shelf member 42 with the shelf member 42 being inclined so that the viewscreen of monitor 43 is viewable through the window 38. Thus, the bottom of monitor 43 rests on flattened bottom portion 42a and the back of the monitor 43 rests against the flattened back member of shelf member 42. The monitor 43, a keyboard (not shown) on tray 39, a printer (not shown) and a CPU (not shown) are interconnected functionally and conventionally.

To adjust the tilt angle of monitor 43 on shelf member 42, the wedge structure 20 is inserted between the bottom of monitor 43 and the upper face of bottom portion 42a with the rearward edge 24 of structure 20 facing outwards relative to kneehole 37. Varying the thickness of structure 20 achieves adjustability for the tilt angle of monitor 43. This adjustability is preferably such that the eyes of a particular user who is seated (chair not shown) at the kneehole 37 are maintainable approximately perpendicularly to the viewscreen of the monitor 43.

A wedge-like structure of this invention can have various forms, as those skilled in the art will readily appreciate. Shown in FIGS. 5, 6, 8, 9 and 10 are embodiments 50, 51, 52, 53 and 54, respectively, wherein, in each respective embodiment, each one of the flattened members comprising the stack thereof has a generally uniform (equal) width, but the individual flattened members each have various longitudinal lengths.

In embodiments 50 and 51, each one of the flattened members has a generally uniform thickness. Each successively higher one of these flattened members has a shorter respective longitudinal length relative to its adjacent preceding lower flattened member. All flattened members generally meet along the structure rearward edge. In the structure 50, the forward edge of each flattened member is tapered forwardly and downwardly so as to terminate generally adjacent the upper forward edge of the adjacent lower flattened member. In the structure 51, the forward edge of each flattened member extends perpendicularly relatively to the opposing faces of each member.

In embodiments 52 and 53, each stack is comprised of at least two groups of flattened members. At least one group 56 is comprised of one of a first plurality of flattened members whose individual lengths extend the full longitudinal length of the stack. At least a second group 57 is comprised of a second plurality of flattened members whose individual lengths extend substantially less than the full longitudinal length of the stack and all such members have generally equal lengths. In embodiment 53, the shorter members 57 are stacked upon a single longer bottom member 56. In embodiment 52, the shorter members 57 are interdigitated with a plurality of the longer members 57. All flattened member generally meet along the rearward edge and all flattened member have the same width.

Embodiment 54 is similar to embodiment 52 except that the wedge taper of each of the shorter members 57 is extended.

The embodiment 55 shown in FIG. 7 is characterised by having a base member plate 58 which is not tapered, but is of constant thickness. Upon plate 58 are stacked wedge configured members of various end edge thicknesses.

Various other and further embodiments, variations applications, structures and the like will be apparent to those skilled in the art from the foregoing description and no undue limitations are to be drawn therefrom.

What is claimed is:

1. An assembly for supporting a monitor means, said assembly being locatable under an aperture in a top member of a work station, said assembly comprising (A) a shelf means for supporting said monitor means, said shelf means including a bottom support member having a front edge portion and a back edge portion and a back support member angularly associated with said back edge portion;

(B) a pair of shelf means side supports, each one being in laterally spaced relationship relative to the other and being located on a different opposing lateral side of said shelf means, and including means for mounting each one of said side supports to said work station beneath said top member;

(C) means for connecting said shelf means to each one of said side supports for holding said shelf means in angularly disposed relationship relative to said aperture; and (D) a wedge structure comprising a plurality of selectively removable plies and having a front edge portion and a back edge portion, said front edge portion having a greater thickness than said back edge portion, and having an upper surface and an opposed lower surface, said lower surface resting upon said bottom support member so that a bottom portion of said monitor means can rest against said upper surface and also a back portion of said monitor means can rest against said back support member.

2. The assembly of claim 1 adapted to support said monitor means whereby said monitor means can rest upon said wedge-like structure and also said back support member.

3. The assembly of claim 1 wherein said assembly is further associated with said work station and each one of said means for mounting is mounted on a different side of said aperture.

* * * * *